Sept. 12, 1939.  J. E. MITCHELL  2,172,619
SELF-CONTAINED COTTON CLEANING AND EXTRACTING MACHINE
Filed April 5, 1937
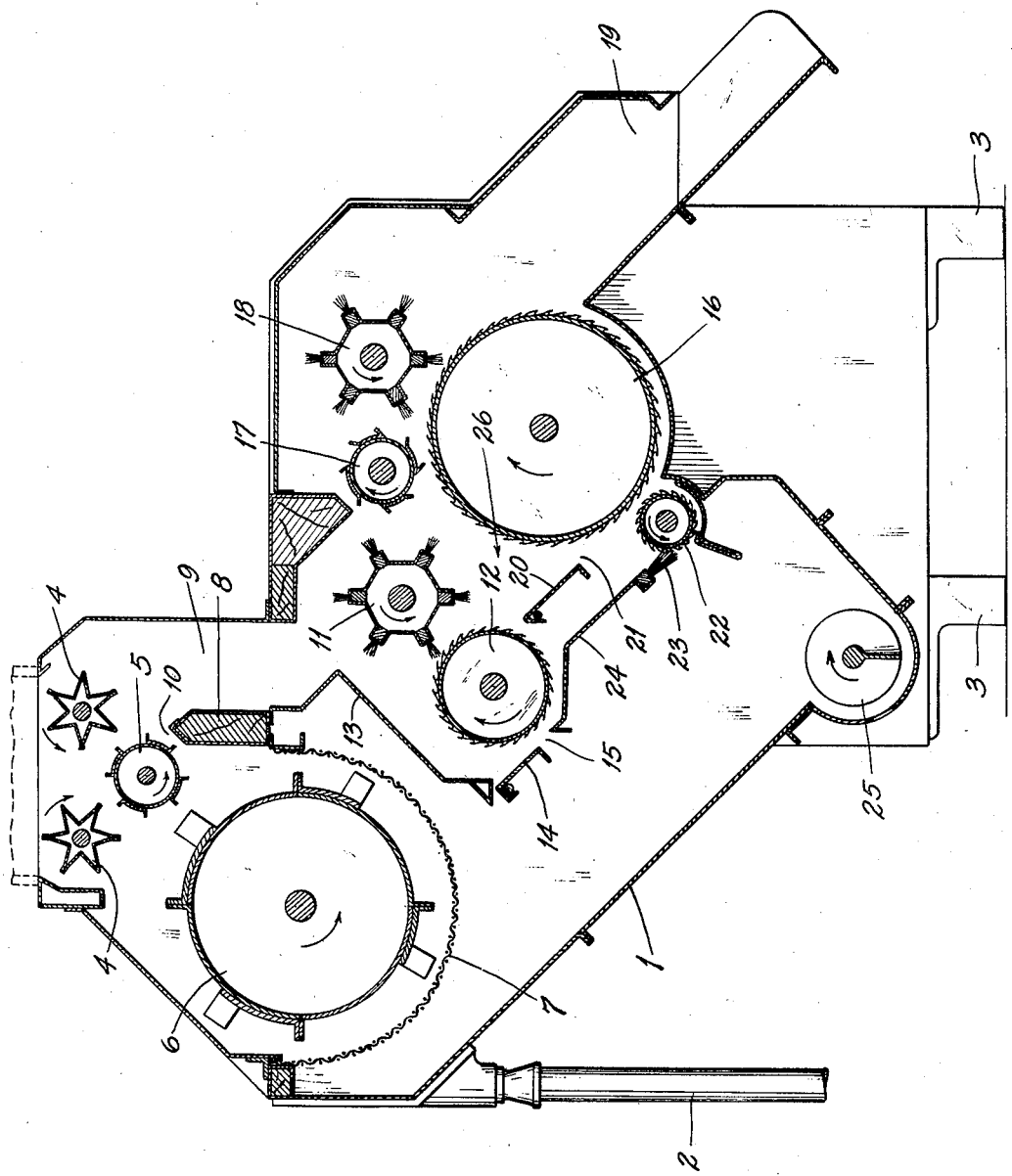
INVENTOR:
JOHN E. MITCHELL,
By  *Bruce D. Elliott*
ATTORNEY.

Patented Sept. 12, 1939

2,172,619

UNITED STATES PATENT OFFICE 2,172,619

SELF-CONTAINED COTTON CLEANING AND EXTRACTING MACHINE

John E. Mitchell, Dallas, Tex.; John E. Mitchell, Jr., Orville Mitchell, and Donald Mitchell, executors of said John E. Mitchell, deceased Application April 5, 1937, Serial No. 134,939

6 Claims. (Cl. 19—37)

The general object of this invention is to provide, within a self-contained machine of a size that is practicable for mounting on a gin stand, mechanism for thoroughly separating hulls and trash from a regulated stream of cotton sufficient in quantity to supply the gin stand.

In my prior patent No. 1,694,480, dated December 11, 1928, I have described and claimed a machine having the same general object in view, but operating on a different principle from that of the present machine. In this prior machine a working zone is provided, the essential elements present in which are a single extracting cylinder, a hull-discharge opening at the rising side thereof provided by the lower end of a hull board, a kicker roll for knocking back hulls and trash carried up with the cotton by the cylinder, and a boll-breaking cylinder operating upon the incoming stream of mixed cotton, hulls and trash passing to the cylinder. Unopened, or partly opened bolls, that do not escape through the hull-discharge opening are returned by the kicker roll to the breaking cylinder to be further acted upon by the latter. Stated otherwise, the machine involves a working zone common to the parts mentioned, that is utilized for the purpose of continuing the action of the breaking cylinder on the unopened bolls as long as necessary, while both cotton and hulls are being simultaneously removed from the machine.

The machine of the above patent has been commercially successful; nevertheless, it was found that when, due primarily to weather conditions, the bolls were unusually tough, the working zone would become congested, or clogged, with bolls that could not be sufficiently opened to escape through the discharge opening past the extracting saw cylinder, unless the same were made wider than necessary when treating the average run of cotton; and widening of this opening resulted in the loss of considerable cotton of value. It is for the purpose, among other objects, of providing against this contingency that the present type of machine has been devised.

In the machine of the present invention, I employ the same working zone principle of my prior patent referred to, and provide for repeated action on unopened or partly opened bolls until the hulls thereof are separated or broken apart, and are thus enabled to be separated from the cotton and to escape through one or the other of the discharge openings provided by the machine. The reducing action on the bolls, however, is carried on outside of the working zone by means of a beating cylinder and discharge roller so arranged and operated as to deliver only a mixture of cotton, hulls and trash to the working zone, while the beating cylinder continues to act upon the unopened or partly opened bolls until the hulls thereof have been separated or broken apart when they, with the contained cotton, are delivered to the working zone. This arrangement of beating cylinder and discharge roller is substantially the same as that shown in my prior patent No. 1,426,583, dated August 22, 1922, and is not herein specifically claimed.

Again, in the present machine, as compared with the machine of my prior patent No. 1,694,480 first above referred to, I employ two saw cylinders, one a comparatively small preliminary extracting cylinder, and the other a much larger main extracting cylinder, having a kicker roll co-operating therewith; and in place of a beating cylinder in the working zone, I employ a combined doffing and directing cylinder, co-operating with the preliminary extracting cylinder, which serves to receive hulls rejected by the kicker roll located above the main extracting cylinder and to return same, with the incoming stream delivered by the discharge roller from the beating cylinder, to the rising side of the preliminary extracting cylinder, past which a considerable percentage of the hulls and trash are constantly discharged through an outlet opening provided for the purpose, the cotton with the remaining hulls being doffed from the initial, or preliminary extracting cylinder, and delivered to the rising side of the second, or main, extracting cylinder, in somewhat the manner shown in another of my prior patents, No. 1,734,592, dated November 5, 1929. Thus the product returned by the combined doffing and directing cylinder for further treatment, is simply the hulls and trash which have failed to escape through the discharge openings provided, respectively, past each extracting cylinder, and which are rejected by the kicker roll of the main extracting cylinder and projected by it onto the combined doffing and directing cylinder, which returns the same to the incoming stream, as stated. As will appear later, some of the hulls and trash are projected by the kicker roll over the top of the doffing and directing cylinder directly into the path of the incoming stream. In either case, however, the return of the rejected hulls and trash to the rising side of the preliminary extracting cylinder is effected by the combined doffing and directing cylinder.

As the discharge opening past the main extracting cylinder is preferably made wider than the opening past the preliminary extracting cylinder to permit the escape of the larger hulls through the same, I provide a small reclaiming saw cylinder, located below said wider opening at the lower portion of the main extracting cylinder, to recover small-lock cotton escaping with the hulls through said opening. This reclaiming feature, which is necessary, or at least desirable, to make the machine complete, or self-contained, is shown and claimed in my prior patent No. 1,613,242, dated January 4, 1927.

Thus, the combined doffing and directing cylinder, the two extracting cylinders, the kicker roll co-operating with the main extracting cylinder, and the hull-discharge outlets past the two cylinders, complete a working zone in which everything which reaches and is rejected by the kicker roll is sent back to the incoming stream and given an opportunity to escape through the discharge outlet past the first extracting cylinder, and such hulls as fail to escape through the first outlet are given an opportunity to escape through the second, or that past the main extracting cylinder; and failing to escape there, they are carried up with the cotton and rejected by the kicker roll, and are again returned to the rising side of the first, or preliminary, extracting cylinder, as explained.

From the foregoing general statement of the purpose and operation of the invention, it will be readily apparent to those skilled in the art, that I prevent congestion in the working zone by delivering the crude product thereto only after the unopened or partly opened bolls have had their hulls separated or broken apart; by providing two extracting cylinders, and securing a partial separation of hulls and trash through the outlet past the initial cylinder, a further separation through the outlet past the second, or main, extracting cylinder, which thus has to deal with a less quantity of hulls and trash, with consequent increase in the efficiency and capacity of said cylinder for extracting the cotton mixed with the hulls and trash; and, finally, by promptly and continuously returning to the initial, or preliminary, extracting cylinder all hulls and trash which fail to escape through the outlet past the main extracting cylinder.

It should be explained, and it is a feature of the invention, that the main extracting cylinder is much larger in diameter than the preliminary extracting cylinder, to permit the use therewith of a kicker roll for knocking back hulls and trash which may be carried up with the cotton, and which it is not feasible to use with a small saw cylinder, or one of the size of the preliminary extracting cylinder which I employ. Moreover, as the function of the latter cylinder is merely to promote a separation of the finer, or smaller, hulls and trash from the crude product, the discharge outlet past the same being made narrow enough to prevent the escape of small-lock cotton, and hence, to some extent, preventing the escape of the larger hulls, no kicker roll need be employed with this cylinder, as it is necessary, in order to prevent congestion of material in the working space at its rising side, that the cotton, as well as all hulls and trash not escaping through its associated outlet, should immediately be removed and delivered for further treatment to the main extracting cylinder. It would obviously promote congestion at the rising side of the preliminary extracting cylinder if a kicker roll were employed to continuously knock back hulls which were too large to escape through the outlet past said cylinder. Also, owing to the relatively small size of this outlet which I prefer to employ, it is unnecessary to provide any cotton reclaiming means in connection with the preliminary extracting cylinder.

As to the main extracting cylinder, however, I prefer to employ a larger outlet opening to facilitate the escape of the larger hulls, and accordingly, as stated, I associate with this opening a small reclaiming saw cylinder, and preferably position the same so that the recovered cotton will be doffed therefrom by the main extracting cylinder, as shown in the drawing.

I wish it understood, however, that neither the relative size of the two extracting cylinders, or of the discharge openings past the same, nor the presence or absence of reclaiming mechanism in connection with either or both extracting cylinders, is of the essence of this invention.

In the accompanying drawing, illustrating a preferred embodiment of the invention, the view is a longitudinal section through a machine constructed according to my invention, the conventional driving mechanism being omitted, and the directions of rotation of the various rotary elements being indicated by arrows.

Referring now to the drawing, the numeral 1 indicates, generally, the casing of the machine which incloses all of the moving parts of the machine hereinafter described, and which is adapted to be mounted on the top of a ginning machine by such means as standards, 2, and supports, 3, in the usual manner. Located beneath an opening provided in the top of the casing for the inlet of the crude material, consisting of a mixture of bolls, cotton, cotton locks, hulls and trash, are conventional feed rollers, 4, and beneath the delivery space between these rollers is a discharge roller, 5, which at its upper side functions to direct, or project, the incoming material onto the down-going side of a beating cylinder, 6, having its lower half-portion surrounded by a screen, 7, and at its lower side to deliver the cotton, hulls and unseparated trash into that part of the casing inclosing the extracting mechanism. The discharge roller 5 in combination with a housing member 8 defines a narrow space through which cotton and loose hulls are discharged freely by the rotation of the roller, but unopened bolls are thrown back around the beating cylinder to be further acted upon until the hulls are freed from the cotton. The casing is shaped to provide a throat, 9, which receives the material delivered by the discharge roller 5 through the narrow space, 10, before alluded to, and in turn delivers it to a combined directing and doffing cylinder, 11, which rotates in doffing relation to a relatively small extracting saw cylinder, 12, these two members rotating in opposite directions, as shown by the arrows thereon. Located at a suitable distance from the rising side of the extracting cylinder 12 is a guide, 13, which with said side of the cylinder provides a working space for the incoming material to be operated on by said cylinder. Co-operating with the lower portion of the rising side of the extracting cylinder 12 is a hull-board, 14, the lower end of which, with said side of the cylinder defines the size of a discharge outlet for hulls and trash past said cylinder. This outlet, 15, is preferably made so narrow as to permit only small trash and hull particles to escape through it and thus prevent the escape of small-lock cotton with said hulls and trash; but this opening may be varied in size as experience with treating different conditions of cotton may indicate to be desirable, by adjusting the lower end of the hull board toward or from the extracting cylinder, in a well-known manner. By preventing the escape of any cotton of value through the discharge opening 15, I obviate the necessity of providing means for recovering cotton-locks which otherwise would escape with the hulls at this point.

Located at a suitable distance from the small extracting cylinder 12 in a horizontal direction is the main extracting saw cylinder, 16, which, as I have stated, is much larger in diameter than the cylinder 12. Co-operating with cylinder 16 at its upper side is a kicker roll, 17, which operates to knock back any hulls or trash carried up with the cotton by the cylinder, and following this kicker roll is a doffer, 18, which operates to remove cotton from cylinder 16 and discharge same into a chute, 19, which delivers it to the gin. Positioned to extend part way between the cylinders 12 and 16 substantially at the bottom of the space between them, is a hull-board, 20, the lower end of which defines with the rising side of the cylinder 16 a discharge opening, 21, the size, or width, of which is sufficient to permit large hulls to escape through the same. As a certain amount of small-lock cotton will inevitably escape through opening 21 with the hulls, I provide reclaiming mechanism for recovering such cotton. To this end I locate at the lower portion of the rising side of the cylinder 16 a small reclaiming saw cylinder, 22, which rotates, on its down-going side, in contact with a brush member, 23, supported at the lower end of an interior frame member, 24. These brushes operate to force the cotton-locks into engagement with the teeth of the reclaiming saws while permitting hulls carried beneath them to be thrown off by centrifugal action. The reclaiming cylinder 22 is preferably located close enough to the cylinder 16 to permit the latter to doff the recovered cotton therefrom, but other means may be employed for this purpose, if desired.

All hulls, trash and other extraneous matter separated from the cotton by the various means described fall into a conveyor, 25, which discharges same from the machine.

The combined directing and doffing cylinder 11, the two extracting cylinders 12, 16, the kicker roll 17 and the hull-discharge outlets 15, 21, complete the working zone heretofore referred to and which, for convenience I have indicated by numeral 26.

In operation, the cotton and loose hulls delivered by the discharge roller 5 fall onto the upper portion of the combined directing and doffing cylinder 11, which directs the same to the rising side of the first, or preliminary, extracting cylinder 12. A considerable portion of the loose hulls and trash will escape through the opening 15, but not any cotton of value. The cotton, with the remaining hulls and trash, is doffed from the down-going side of the preliminary extracting cylinder by the cylinder 11 and discharged thereby onto the rising side of the main extracting cylinder 16, and more or less of the remaining hulls will escape through the opening 21. Some of the hulls will be carried up with the cotton by the teeth of cylinder 16, and these hulls will be rejected by the kicker roll 17 and redelivered by cylinder 11 to the rising side of the preliminary extracting cylinder, in the manner previously explained. In this manner the hulls and trash will be thoroughly separated from the cotton, and all congestion in the working zone of the machine will be avoided.

I claim:

1. In a machine for separating hulls from cotton, the combination of a pair of horizontally-disposed saw-cylinders separated from each other to provide a working space and rotating in the same direction, each having a hull-board co-operating therewith to provide between the lower edge of each hull-board and the rising side of each saw-cylinder a space through which hulls may be discharged, means for delivering against the rising side of the first saw-cylinder a stream of mixed cotton and hulls to separate a portion of the hulls from the stream, a rotatable doffer operating to remove the remaining mixed cotton and hulls from the first saw-cylinder and to direct same against the rising side of the second saw-cylinder, and a rotatable kicker roll co-operating with said second saw-cylinder to knock back such hulls as are carried up with the cotton by the saw teeth and to direct said rejected hulls over the top of the doffer into the path of the incoming stream of mixed cotton and hulls.

2. In a machine for separating hulls from cotton, the combination of a preliminary and a main extracting saw-cylinder separated from each other to provide a working space, and the preliminary saw-cylinder being positioned to receive an incoming stream of mixed cotton, hulls and trash, a hull-board co-operating with the rising side of the latter cylinder and the lower end of which defines with said side an opening for the escape of a portion of the hulls and trash from said stream, a hull-board positioned between said cylinders at the bottom of the working space and the lower end of which defines with the rising side of said main extracting cylinder an opening for the escape of hulls and trash, a rotatable cylinder operating at the top of said working space, and a kicker roll co-operating with the upper portion of said main extracting cylinder and adapted to reject hulls and trash carried up with the cotton and to direct same toward and over said rotatable cylinder, the latter functioning to direct the incoming stream to the rising side of the preliminary extracting cylinder, to doff the cotton and remaining hulls and trash carried up by the latter cylinder and deliver same to the rising side of the main extracting cylinder, and to return hulls and trash ejected by said kicker roll to the incoming stream being directed by the rotatable cylinder to the rising side of the preliminary extracting cylinder.

3. In a machine for separating hulls from cotton, the combination of a preliminary extracting saw-cylinder positioned to receive an incoming stream of mixed cotton and hulls, a hull-board co-operating with the rising side of said cylinder the lower end of which defines with said side an opening for the escape of a portion of the hulls and trash from said stream, a main extracting saw-cylinder rotating in the same direction as the preliminary extracting cylinder and separated therefrom to provide a working space between them, a hull-board co-operating with the rising side of said main extracting cylinder and the lower end of which defines with said side an opening of greater width than the first-named opening for the free escape of hulls and trash, a kicker roll co-operating with the upper portion of said main extracting cylinder and adapted to reject hulls and trash carried up with the cotton and project same toward said incoming stream, and a single rotary member functioning to direct the incoming stream to the rising side of the preliminary extracting cylinder, to doff the cotton and remaining hulls and trash carried up by the latter cylinder and deliver same to the rising side of the main extracting cylinder, and to return hulls and trash rejected by said kicker roll to the rising side of said preliminary extracting cylinder.

4. A machine for separating hulls from cotton comprising, in combination, a small extracting saw-cylinder having associated therewith means providing a relatively narrow opening permitting the escape of small hulls and trash only past the same, a large extracting cylinder spaced from the first cylinder and having associated therewith means providing a relatively wide opening permitting the escape of the larger hulls therethrough, means for delivering a stream of mixed cotton and hulls to the rising side of the small extracting cylinder to effect a separation of a portion of the hulls from the stream, a doffer co-operating with the descending side of the small extracting cylinder for removing the cotton and remaining hulls therefrom and delivering same to the large extracting cylinder, a hull-rejecting kicker roll co-operating with the upper portion of the large extracting cylinder and serving as an element in effecting the return of the hulls rejected by it to the rising side of the small extracting cylinder, and means for recovering and returning to the large extracting cylinder any cotton escaping with the hulls through the relatively wide opening past said cylinder.

5. In a machine for separating hulls from cotton, a pair of separated extracting cylinders each of which borders a hull-discharge outlet extending past the same, means for delivering a stream of mixed cotton and hulls to one of said cylinders, a doffer co-operating with the latter cylinder and discharging the doffed product to the other cylinder, and a kicker roll co-operating with the latter cylinder, the described elements being arranged and adapted to permit, in succession, the escape of hulls past the two cylinders and to effect the return to the rising side of the initial cylinder of all products rejected by the kicker roll of the second cylinder.

6. A self-contained machine for separating hulls from cotton comprising, in combination, a pair of separated extracting cylinders each of which borders a hull-discharge outlet extending past the same, means for feeding a stream of mixed cotton, bolls, hulls and trash to the machine, means for opening the bolls and loosening the hulls from the cotton and then delivering the loosened hulls, cotton and trash to one of said cylinders, a doffer co-operating with the latter cylinder and discharging the doffed product to the other cylinder, and a kicker roll co-operating with the second cylinder, the construction being arranged and adapted to effect the escape of hulls past the two cylinders in succession and the return to the rising side of the initial cylinder of all products rejected by the kicker roll of the second cylinder.

JOHN E. MITCHELL.